(12) United States Patent
Singer et al.

(10) Patent No.: US 6,722,049 B2
(45) Date of Patent: Apr. 20, 2004

(54) INCLINATION MEASUREMENT APPARATUS

(76) Inventors: Yuval Singer, 86 Hatishbi Street, Haifa (IL), 34522; Federico Singer, 35 Patrick St., Branford, CT (US) 06405

( * ) Notice: Subject to any disclaimer, the term of this patent is extended or adjusted under 35 U.S.C. 154(b) by 0 days.

(21) Appl. No.: 10/310,180

(22) Filed: Dec. 5, 2002

(65) Prior Publication Data

US 2003/0084582 A1 May 8, 2003

Related U.S. Application Data

(63) Continuation-in-part of application No. 09/916,438, filed on Jul. 30, 2001, now Pat. No. 6,546,639.

(30) Foreign Application Priority Data

Dec. 6, 2001 (IL) ................................................ 146981

(51) Int. Cl.$^7$ ................................................ G01C 9/12
(52) U.S. Cl. ........................... 33/391; 33/397; 33/401; 33/366.13; 33/366.25; 33/1 N; 33/1 PT
(58) Field of Search ..................... 33/365, 366.11, 33/366.24, 366.25, 366.26, 391, 397, 401, 534, 536, 366.13, 1 N, 1 PT

(56) References Cited

U.S. PATENT DOCUMENTS

| 3,829,981 A | | 8/1974 | Vlasblom |
| 3,849,897 A | | 11/1974 | Markakis et al. |
| 3,876,309 A | * | 4/1975 | Zicaro et al. ................. 33/366 |
| RE28,694 E | | 1/1976 | Markakis et al. |
| 3,956,831 A | * | 5/1976 | Sibley ......................... 33/352 |
| 4,196,524 A | | 4/1980 | Bechtel |
| 4,528,760 A | | 7/1985 | Plummer |
| 4,584,778 A | * | 4/1986 | Komasaku et al. ........... 33/366 |
| 4,680,867 A | | 7/1987 | Hufman et al. |
| 4,694,584 A | * | 9/1987 | Mills ........................... 33/366 |
| 4,866,850 A | | 9/1989 | Kelly et al. |
| 4,942,668 A | * | 7/1990 | Franklin ....................... 33/366 |
| 4,943,158 A | | 7/1990 | Pertl et al. |
| 4,974,329 A | | 12/1990 | Willa |
| 5,184,336 A | | 2/1993 | Wanger et al. |
| 5,210,954 A | | 5/1993 | Schafler |
| 5,317,810 A | | 6/1994 | Isono et al. |
| 5,365,671 A | | 11/1994 | Yaniger |
| 5,406,713 A | * | 4/1995 | Oman et al. .................. 33/366 |
| 5,435,067 A | * | 7/1995 | Uchida et al. ............... 33/1 PT |
| 5,575,073 A | | 11/1996 | von Wedemayer |
| 2002/0002777 A1 | * | 1/2002 | Torr ........................... 33/1 PT |
| 2002/0053144 A1 | | 5/2002 | Matsumoto et al. |
| 2002/0073563 A1 | | 6/2002 | Toda et al. |

FOREIGN PATENT DOCUMENTS

| FR | 2640042 | 6/1990 |
| JP | 62096813 | 5/1987 |
| JP | 62129718 | 6/1987 |
| JP | 63015112 | 1/1988 |
| JP | 01136010 | 5/1989 |

* cited by examiner

Primary Examiner—Christopher W. Fulton
Assistant Examiner—Travis Reis
(74) Attorney, Agent, or Firm—Nath & Associates PLLC; Harold L. Novick

(57) ABSTRACT

Inclination measurement apparatus includes an indexable clinometer bearing turntable rotatable in a single plane between a pair of precisely reproducible diametrically opposite orientations with respect to the desired measurement axis for respectively issuing inclination measurements $V_0$ and $V_{180}$ responsive to the inclination of a surface with respect to a desired measurement axis, and a reference clinometer for enabling uninterrupted accurate bias corrected inclination measurements of the inclination of the surface with respect to the desired measurement axis by virtue of its inclination measurements being employed for calculating bias corrected inclination measurements.

22 Claims, 5 Drawing Sheets

INCLINATION MEASUREMENT APPARATUS

This application is a continuation-in-part of U.S. patent application Ser. No. 09/916,438 filed on Jul. 30, 2001 entitled Inclination Measurement Apparatus, now U.S. Pat. No. 6,546,639 the entire contents of which are hereby incorporated by reference in their entirety.

FIELD OF THE INVENTION

The invention relates to inclination measurement apparatus and more particularly to inclination measurement apparatus capable of inclination measurements with an accuracy in the order of $10^{-4}°$.

BACKGROUND OF THE INVENTION

In U.S. Pat. No. 5,210,954 to Schafler, there is illustrated and described an inclination measurement apparatus designed to compensate for a clinometer's inherent susceptibility to bias and gain changes for issuing accurate inclination measurements of the inclination of a surface with respect to X and/or Y measurement axes. The inclination measurement apparatus includes a clinometer mounted on a turntable vertically displaceable with respect to a base plate by way means of a lifting device whereby, pursuant to an initial upward displacement of the turntable away from the base plate, a half-turn rotation, and a final downward displacement theretoward, the clinometer is indexable between a pair of precisely reproducible diametrically opposite orientations with respect to a desired measurement axis for bias correction. The turntable is also tiltable in the direction of two diametrically opposed calibration axis for gain correction. Moreover, a clinometer is only truly accurate at rest and also requires a relatively long settling down time after being displaced during a bias correction procedure before being truly accurate again, thereby resulting in a relatively lengthy "dead time" during which time the inclination measurement apparatus is effectively inoperable. More problematic though is that even a slight change in inclination, or worse still a sudden jolt, or the like, during a bias correction procedure yields a presumed accurate bias value which is, in fact, inaccurate leading to inaccurate inclination measurements until the next unaffected bias correction procedure.

SUMMARY OF THE INVENTION

Generally speaking, an inclination measurement apparatus in accordance with the present invention includes an indexable clinometer bearing turntable rotatable in a single plane between a pair of precisely reproducible diametrically opposite orientations with respect to a desired measurement axis for respectively issuing inclination measurements $V_0$ and $V_{180}$ responsive to the inclination of a surface with respect to the desired measurement axis. The inclination measurement apparatus also preferably includes a reference clinometer for enabling uninterrupted accurate bias corrected inclination measurements of the inclination of the surface with respect to the desired measurement axis by virtue of its inclination measurements being employed for calculating bias corrected inclination measurements at least during periodic bias correction procedures depending on the mode of operation of the inclination measurement apparatus, and monitoring their validity. The reference clinometer is also preferably selectively disposable between a pair of gain calibration positions subtending a predetermined highly accurate angle therebetween in a plane perpendicular to the desired measurement axis, thereby enabling its gain to be periodically determined for improving the accuracy of its inclination measurements.

The inclination measurement apparatus of the present invention can be implemented as either a single axis inclination measurement apparatus or a dual axis inclination measurement apparatus. A single axis inclination measurement apparatus typically includes a pair of co-aligned single axis clinometers, for example, the TS30 model commercially available from Singer Instruments and Control Ltd, Tirat Carmel, Israel. Based on the principle of the single axis inclination measurement apparatus, a dual axis inclination measurement apparatus includes a reference dual axis clinometer or, alternatively, a pair of mutually perpendicular reference single axis clinometers. Also, an indexable dual axis clinometer or, alternatively, a pair of mutually perpendicular indexable single axis clinometers or, alternatively, a single indexable single axis clinometer rotatable between two mutually perpendicular pairs of precisely reproducible diametrically opposite orientations. It should be noted that there are no absolute constraints regarding the relative orientations between the reference clinometer(s) and the indexable clinometer(s) of a dual axis inclination measurement apparatus but they are preferably co-aligned to simplify calculating bias corrected inclination measurements with respect to desired mutually perpendicular measurement axes.

BRIEF DESCRIPTION OF THE DRAWINGS

In order to understand the invention and to see how it can be carried out in practice, preferred embodiments will now be described, by way of non-limiting examples only, with reference to the accompanying drawings, in which similar parts are likewise numbered, and in which.

DETAILED DESCRIPTION OF THE PREFERRED EMBODIMENT

Figure 1:
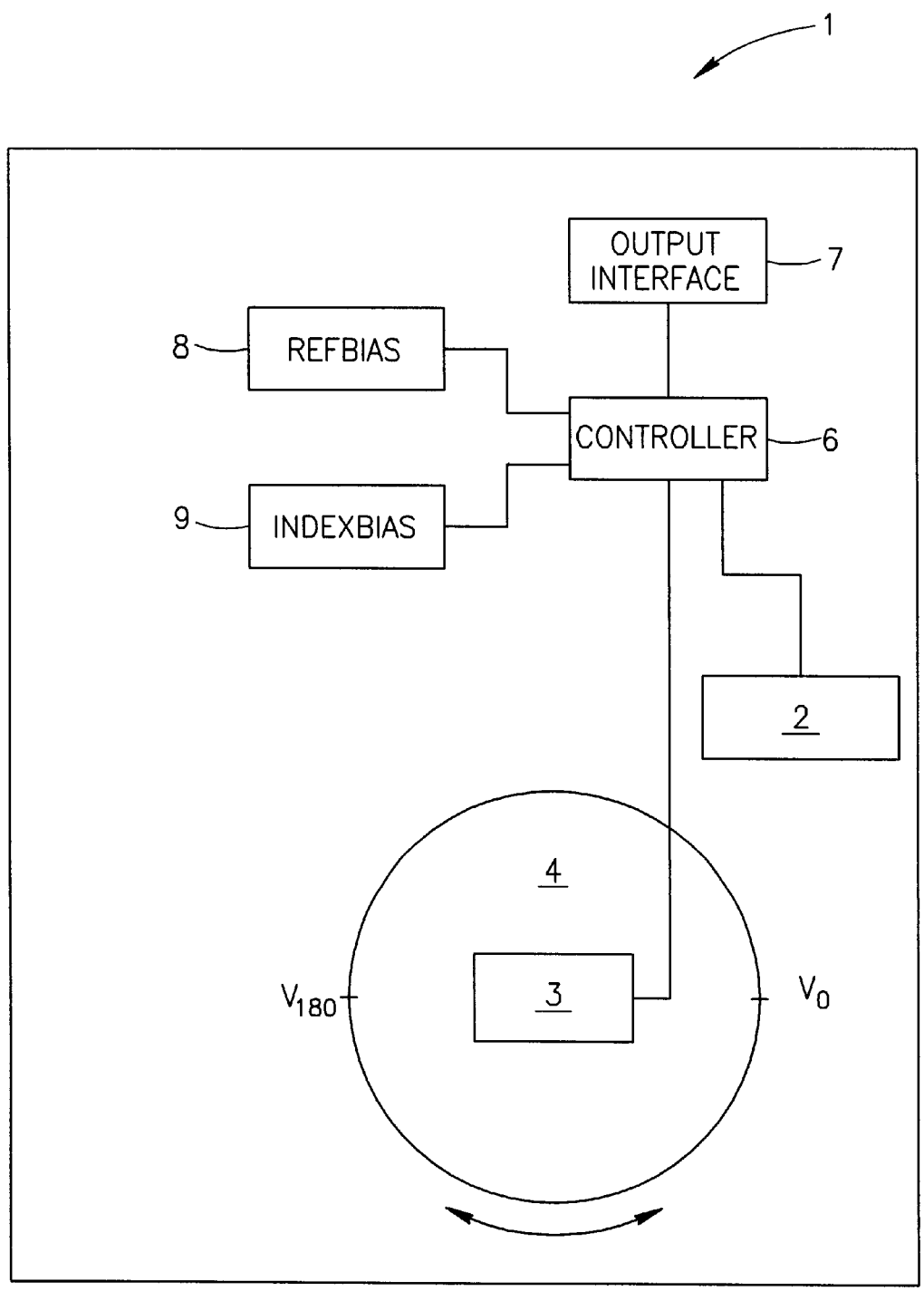
FIG. 1 is a schematic representation of a single axis inclination measurement apparatus for mounting on a surface for measuring its inclination with respect to a desired measurement axis.

FIG. 1 shows a single axis inclination measurement apparatus 1 for mounting on a surface substantially perpendicular to the local gravity vector at the apparatus' location for measuring its inclination with respect to a desired measurement axis. The inclination measurement apparatus 1 includes a reference clinometer 2 for issuing an inclination measurement Vref, an indexable clinometer 3 mounted on a turntable 4 rotatable in a single plane between a pair of precisely reproducibly diametrically opposite orientations with respect to the desired measurement axis for respectively issuing inclination measurements $V_0$ and $V_{180}$, a controller 6, and an output interface 7, for example, RS-232.

The reference clinometer 2 has a transient bias value Vrefbias stored in a REFBIAS register 8 whilst the indexable clinometer 3 has a transient bias value Vindexbias possibly stored in an INDEXBIAS register 9 depending on the mode of operation of the inclination measurement apparatus 1. The indexable clinometer bearing turntable 4 may be stopped at its diametrically opposite orientations by mechanical means, electro-mechanical means, and the like.

Figure 2:
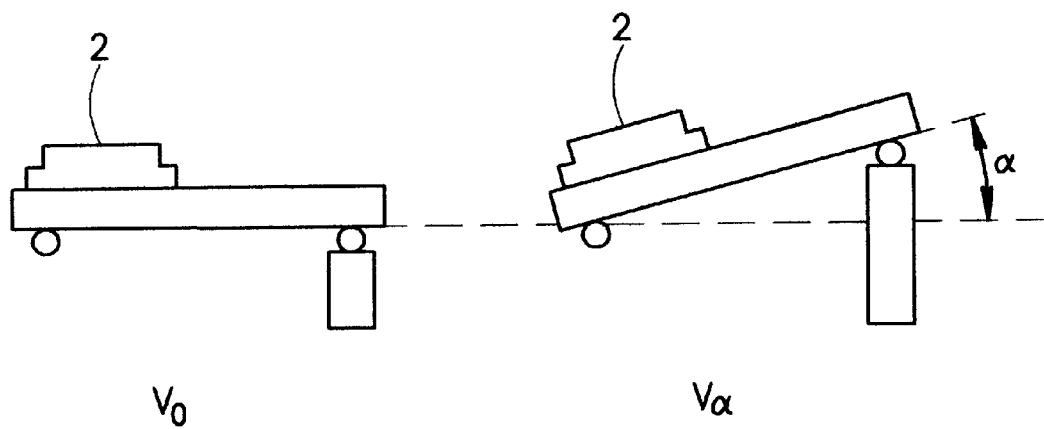
FIG. 2 is a schematic representation showing the tilting of the reference clinometer of the inclination measurement apparatus of FIG. 1 for determining its gain.

FIG. 2 shows that the reference clinometer 2 is selectively disposable between a first horizontal gain calibration position for issuing a measurement inclination $V_0$, and a second gain calibration position for issuing a measurement inclination $V_\alpha$ for periodically determining its gain K (V/°) in accordance with the formula $K=(V_\alpha-V_0)/\alpha$ where $\alpha$ is the predetermined highly accurate angle subtended between the two gain calibration positions in the plane perpendicular to desired measurement axis. Thereafter, the controller 6 can compensate for the reference clinometer's gain by multiplying its inclination measurements Vref by its transient gain value K.

Figure 3:
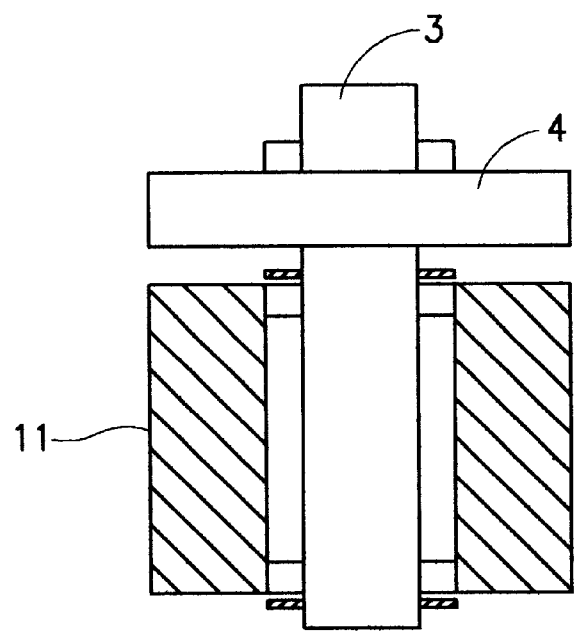
FIG. 3 is a cross section view of a first preferred implementation of the indexable clinometer bearing turntable of the inclination measurement apparatus of FIG. 1.
Figure 4:
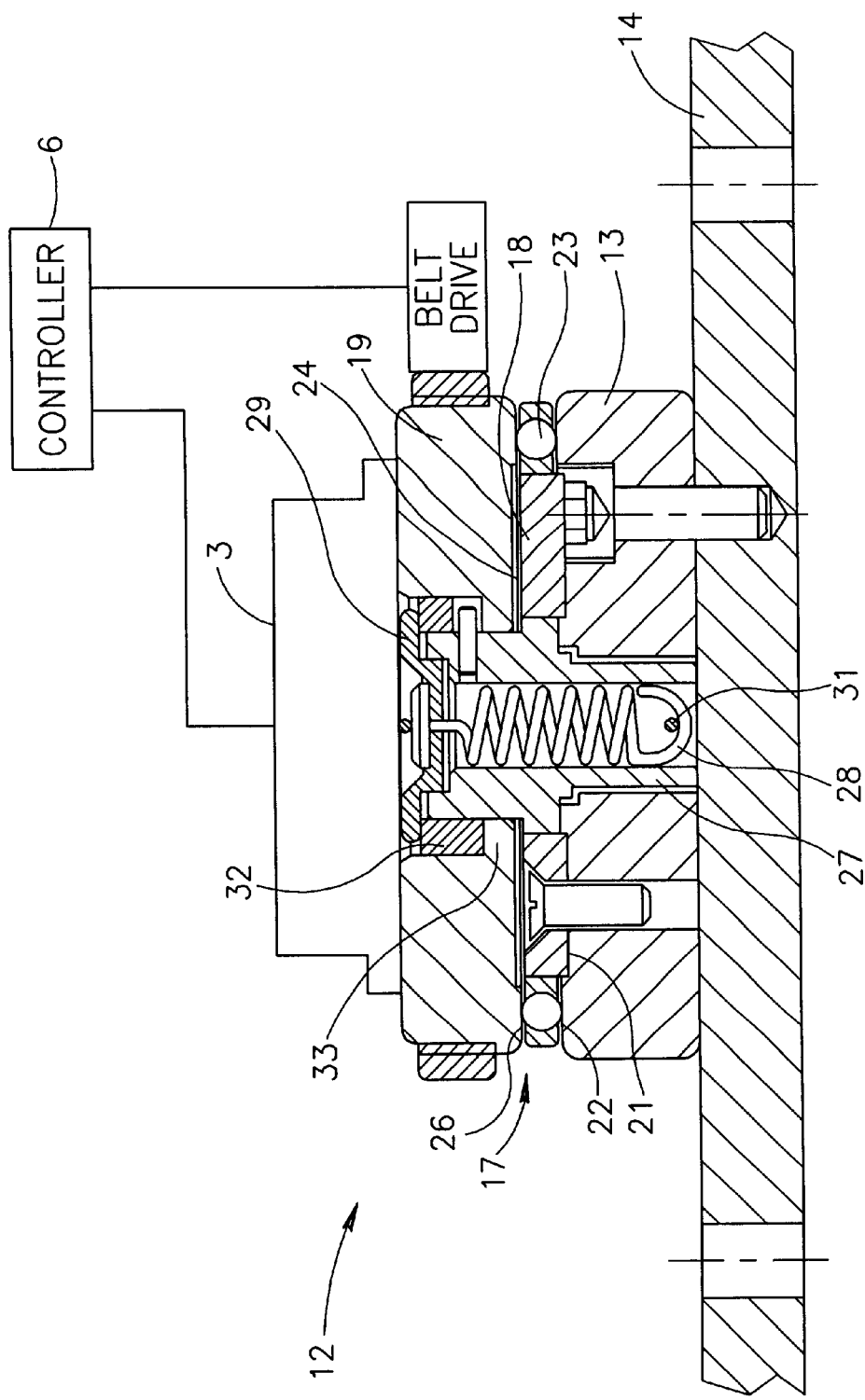
FIG. 4 is a cross section view of a second preferred implementation of the indexable clinometer bearing turntable of the inclination measurement apparatus of FIG. 1.

The indexable clinometer bearing turntable 4 may be directly driven by a motor 11 (see FIG. 3). Alternatively, the indexable clinometer 3 may be mounted on a ball bearing 12 illustrated and described in U.S. patent application publication No. US 2002/0092189 to Singer et al. incorporated herein by reference (see FIG. 4) but differing therefrom insofar that it has now been found that lower tolerances do not severely militate against the accuracy of the inclination measurement apparatus 1. Thus, the ball bearing 12 includes a housing washer 13 rigidly mounted on a base plate 14, a cage assembly 17, an annular spacer 18, and a shaft washer 19. The housing washer 13 has an upper surface 21 including a flat annular upper bearing surface 22. The cage assembly 17 is mounted exterior to the spacer 18, and typically contains about thirty balls 23. The shaft washer 19 has a lower surface 24 with a flat annular lower bearing surface 26 continuously bearing on the uppermost surfaces of the balls 23 whose lowermost surfaces continuously bear on the housing washer 13. The upper and lower bearing surfaces 22 and 26 have a flatness tolerance of between about 5 μm and about 0.01 μm whilst the balls 23 have a spherical tolerance of between about 1 μm and about 0.05 μm depending on the intended application of the inclination measurement apparatus 1. The centrally mounted tubular sleeve 27 is seated within the ball bearing 12 for receiving a tension spring 28 extending between a closure plate 29 and an anchor point 31 located adjacent the base plate 14. The tension spring 28 positively urges the closure plate 29 against another spacer ring 32 which in turn positively urges against an innermost shoulder 33 of the shaft washer 19 for ensuring intimate contact between the bearing surfaces 22 and 26 and the cage assembly 17 despite ambient temperatures changes, and the like which may otherwise affect the precise arrangement of the ball bearing 12.

Figure 5:
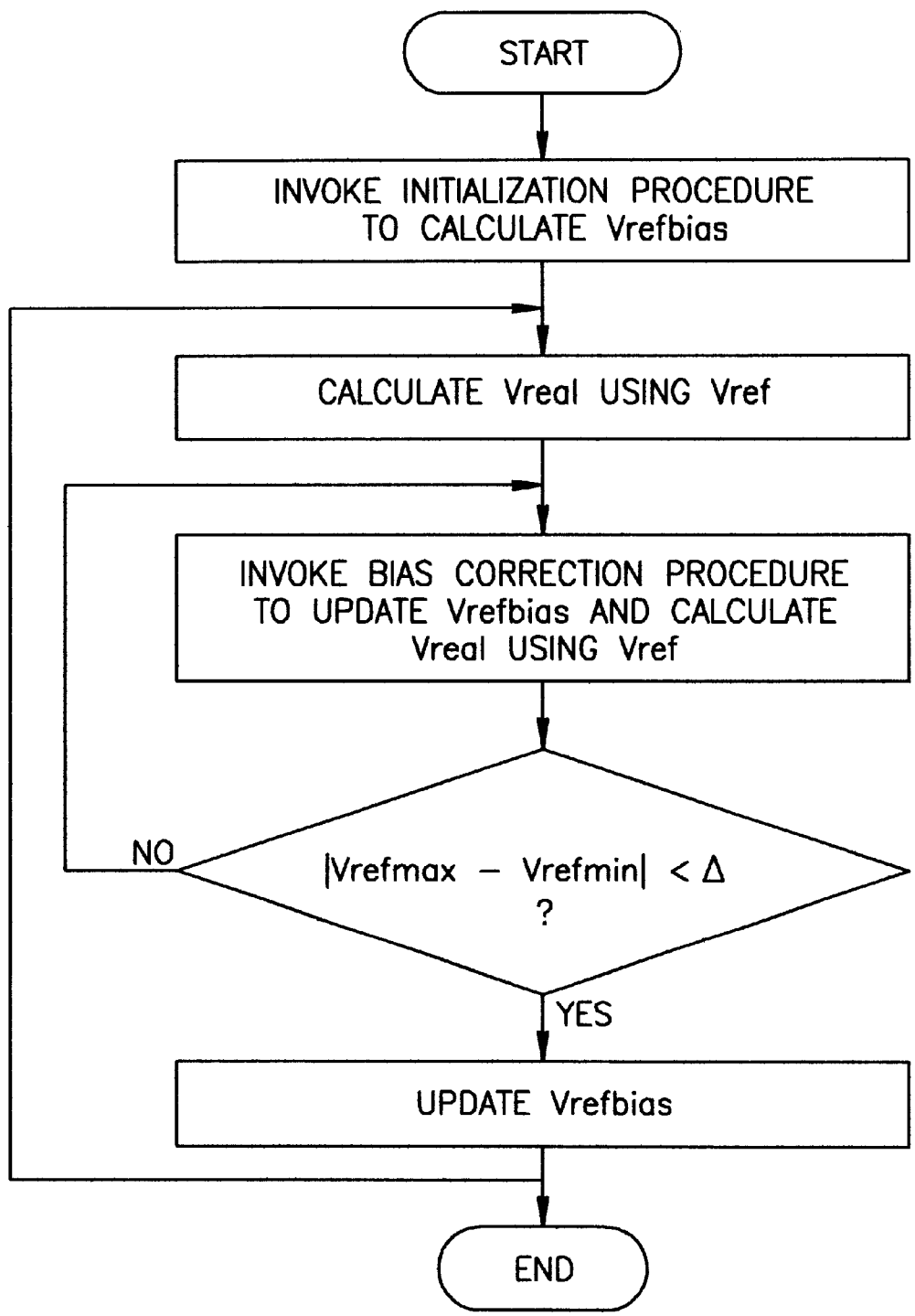
FIG. 5 is a flow diagram showing a first preferred mode of operation of the inclination measurement apparatus of FIG. 1.

FIG. 5 shows a first preferred mode of operation of the inclination measurement apparatus 1 for measuring the inclination of a surface with respect to a desired measurement axis. In this mode of operation, the controller 6 invokes an initialization procedure to determine the reference clinometer's initial transient bias value Vrefbias for storage in the REFBIAS register 8. The controller 6 rotates the indexable clinometer 3 to its first operative orientation for measuring an inclination measurement $V_0$ thereat, and thereafter through a half-turn to its second operative orientation for issuing an inclination measurement $V_{180}$ thereat. The controller 6 calculates the bias corrected inclination measurement Vreal in accordance with the relationship Vreal=½($V_0$−$V_{180}$), and then calculates the reference clinometer's initial transient bias value Vrefbias in accordance with the relationship Vrefbias=Vref−Vreal. The REFBIAS register 8 is only initialized on the condition that the inclination measurement Vref is substantially stable during the bias correction procedure. An exemplary condition is that |Vrefmax−Vrefmin|<Δ where Vrefmax is Vref's maximum value during the bias correction procedure, Vrefmin is its minimum value, and Δ is a predetermined threshold of, say, 0.001°. Thereafter, the controller 6 calculates bias corrected inclination measurements in accordance with the relationship Vreal=Vref−Vrefbias and periodically executes a bias correction procedure similar to the initialization procedure to update the reference clinometer's transient bias value Vrefbias, and a gain calibration procedure to correct for its gain.

Figure 6:
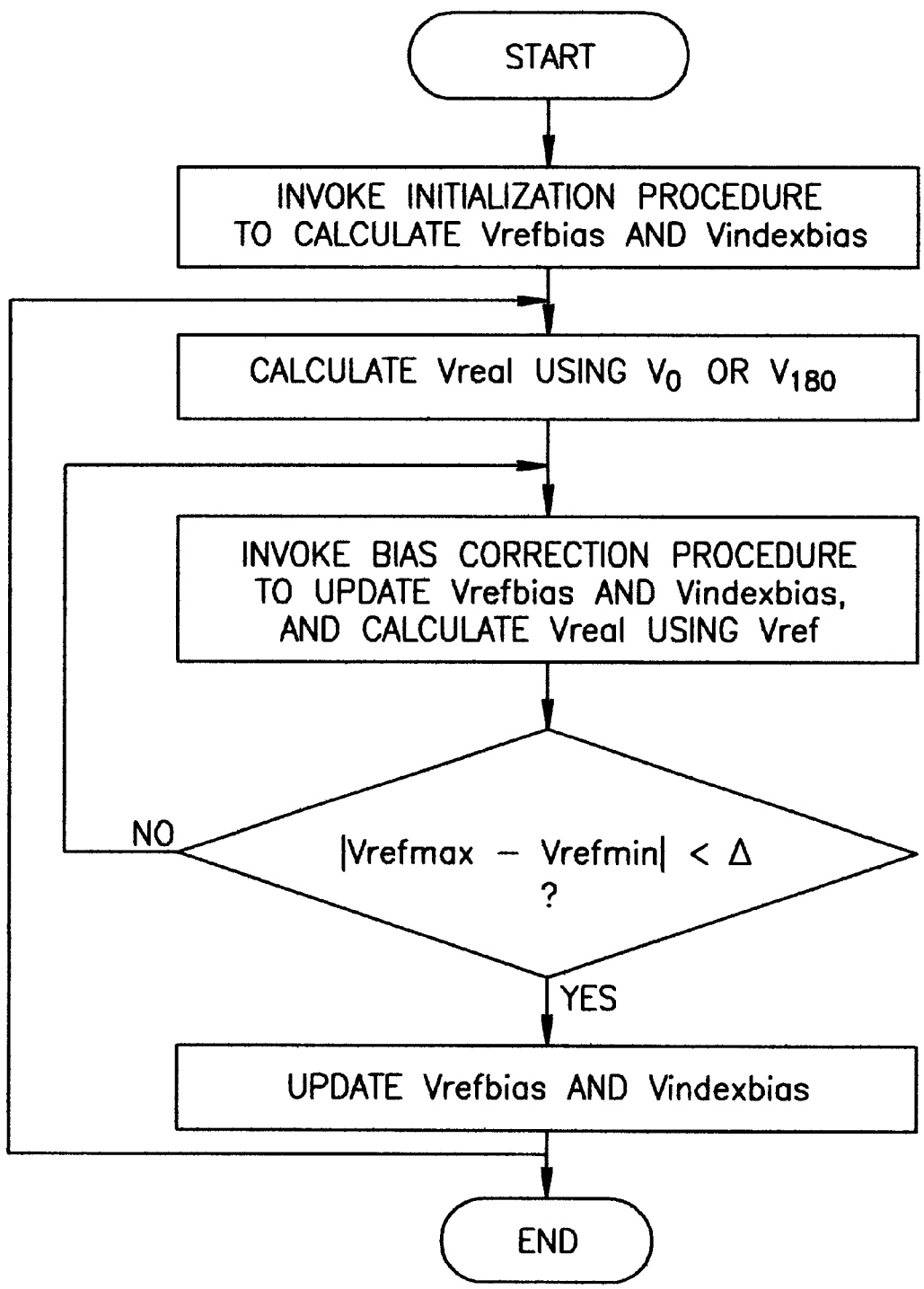
FIG. 6 is a flow diagram showing a second preferred mode of operation of the inclination measurement apparatus of FIG. 1.

FIG. 6 shows a second preferred mode of operation of the inclination measurement apparatus 1 for measuring the inclination of a surface with respect to a desired measurement axis. In this mode of operation, the controller 6 calculates bias corrected inclination measurements Vreal in accordance with one of the relationships Vreal=$V_0$−Vindexbias and Vreal=Vindexbias−$V_{180}$ depending on the orientation of the indexable clinometer 3 with respect to the desired measurement axis except during bias correction procedures when it calculates bias corrected inclination measurements Vreal in the same manner as in the first mode of operation, namely, Vreal=Vref−Vrefbias. Thus, in this case, the controller 6 calculates both transient bias values Vrefbias and Vindexbias during the initialization procedure and subsequent bias correction procedures where Vindexbias is calculated in accordance with the relationship Vindexbias=½($V_0$+$V_{180}$)

While the invention has been described with respect to a limited number of embodiments, it will be appreciated that many variations, modifications, and other applications of the invention can be made within the scope of the appended claims. For example, the reference clinometer can be equally employed in other implementations of inclination measurement apparatus having an indexable clinometer bearing turntable, say, U.S. Pat. No. 5,210,954 to Schafler, and the like.

What is claimed is:

1. Inclination measurement apparatus for mounting on a measured surface for measuring an inclination of the measured surface in an inclination measurement plane with respect to a desired measurement axis, the apparatus comprising:

(a) an indexable turntable bearing a clinometer;
   (b) a mounting that can be mounted on the measured surface and which in turn mounts said turntable so that said turntable is rotatable in a single plane that is perpendicular to the inclination measurement plane between a pair of precisely reproducible diametrically opposite orientations with respect to the desired measurement axis for respectively issuing inclination measurements $V_0$ and $V_{180}$ responsive to the inclination of the surface in the inclination measurement plane with respect to the desired measurement axis; and
   (c) a controller for calculating a bias corrected inclination measurement Vreal of the inclination of the surface with respect to the desired measurement axis from an inclination measurement $V_0$ and $V_{180}$.

2. Apparatus according to claim 1 wherein said indexable clinometer bearing turntable is driven by a motor.

3. Apparatus according to claim 2 wherein said indexable clinometer bearing turntable is directly driven by a motor.

4. Apparatus according to claim 1 wherein said indexable clinometer bearing turntable is constituted by a clinometer mounted on a ball bearing having:

I) a housing washer having a flat annular upper bearing surface, ii) a cage assembly including a plurality of balls whose lowermost surfaces continuously bear on said upper bearing surface, and iii) a rotatable shaft washer having a flat annular lower bearing surface continuously bearing on the uppermost surfaces of said balls, wherein said upper and lower bearing surfaces are lapped to a flatness tolerance of at least 5 μm.

5. Apparatus according to claim 4 wherein said balls having a spherical tolerance of at least 1 μm.

6. Apparatus according to claim 1 and further comprising a reference clinometer for issuing inclination measurements Vref responsive to the inclination of the surface with respect to the desired measurement axis wherein said controller calculates a bias corrected inclination measurement Vreal of the inclination of the surface with respect to the desired measurement axis from an inclination measurement Vref at least during a periodic bias correction procedure for updating at least one of said clinometers' transient bias values.

7. Apparatus according to claim 6 wherein said controller updates at least one of said clinometers' transient bias values pursuant to a bias correction procedure during which said reference inclinometer's inclination measurements Vref were substantially stable.

8. Apparatus according to claim 6 wherein said controller updates at least one of said clinometers' transient bias values on the condition that |Vrefmax-Vrefmin|<Δ where Δ is a predetermined threshold, and Vrefmax and Vrefmin are respectively the reference clinometer's maximum and minimum inclination measurements during a bias correction procedure.

9. Apparatus according to claim 6 wherein said reference clinometer is selectively disposable between at least a pair of gain calibration positions subtending a predetermined highly accurate angle therebetween in the inclination measurement plane.

10. Apparatus according to claim 1 for measuring the inclination of the surface with respect to a single desired measurement axis.

11. Apparatus according to claim 1 for measuring the inclination of the surface with respect to a pair of mutually perpendicular desired measurement axes.

12. Inclination measurement apparatus for mounting on a surface for measuring its inclination with respect to a desired measurement axis, the apparatus comprising:

a. a reference clinometer for issuing inclination measurements Vref responsive to the inclination of the surface with respect to the desired measurement axis;

b. an indexable turntable bearing a clinometer and rotatable between a pair of precisely reproducible diametrically opposite orientations with respect to the desired measurement axis for respectively issuing inclination measurements $V_0$ and $V_{180}$ responsive to the inclination of the surface with respect to the desired measurement axis; and c. a controller for calculating a bias corrected inclination measurement Vreal of the inclination of the surface with respect to the desired measurement axis from an inclination measurement Vref at least during a periodic bias correction procedure for updating at least one of said clinometers' transient bias values.

13. Apparatus according to claim 12 wherein said controller continuously calculates bias corrected inclination measurements Vreal from inclination measurement Vref.

14. Apparatus according to claim 12 wherein said controller updates at least one of said clinometers' transient bias values pursuant to a bias correction procedure during which said reference clinometer's inclination measurements Vref were substantially stable.

15. Apparatus according to claim 14 wherein said controller updates at least one of said clinometers' transient bias values on the condition that |vrefmax-Vrefmin|<Δ where Δ is a predetermined threshold, and Vrefmax and Vrefmin are respectively the reference clinometer's maximum and minimum inclination measurements during a bias correction procedure.

16. Apparatus according to claim 12 wherein said reference clinometer is selectively disposable between at least a pair of gain calibration positions subtending a predetermined highly accurate angle therebetween in a plane perpendicular to the desired measurement axis for periodically determining its gain.

17. Apparatus according to claim 12 wherein said indexable clinometer bearing turntable is driven by a motor.

18. Apparatus according to claim 17 wherein said indexable clinometer bearing turntable is directly driven by a motor.

19. Apparatus according to claim 12 wherein said indexable clinometer bearing turntable is constituted by a clinometer mounted on a ball bearing having:

I) a housing washer having a flat annular upper bearing surface, ii) a cage assembly including a plurality of balls whose lowermost surfaces continuously bear on said upper bearing surface, and iii) a rotatable shaft washer having a flat annular lower bearing surface continuously bearing on the uppermost surfaces of said balls, wherein said upper and lower bearing surfaces are lapped to a flatness tolerance of at least 5 μm.

20. Apparatus according to claim 19 wherein said balls having a spherical tolerance of at least 1 μm.

21. Apparatus according to claim 12 for measuring the inclination of the surface with respect to a single desired measurement axis.

22. Apparatus according to claim 12 for measuring the inclination of the surface with respect to a pair of mutually perpendicular desired measurement axes.

* * * * *